(12) United States Patent
Lee et al.

(10) Patent No.: US 11,010,594 B2
(45) Date of Patent: May 18, 2021

(54) APPARATUS AND METHOD FOR CONTROLLING VEHICLE

(71) Applicants: Hyundai Motor Company, Seoul (KR); Kia Motors Corporation, Seoul (KR)

(72) Inventors: Hye Jin Lee, Hwaseong-si (KR); Hyun Sang Kim, Hwaseong-si (KR); Hee Won Shin, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 99 days.

(21) Appl. No.: 16/184,468

(22) Filed: Nov. 8, 2018

(65) Prior Publication Data

US 2020/0117885 A1 Apr. 16, 2020

(30) Foreign Application Priority Data

Oct. 11, 2018 (KR) .......................... 10-2018-0121244

(51) Int. Cl.
*G06K 9/00* (2006.01)
*G06F 9/451* (2018.01)
(Continued)

(52) U.S. Cl.
CPC .......... *G06K 9/00268* (2013.01); *B60R 25/25* (2013.01); *B60R 25/305* (2013.01); *G06F 3/011* (2013.01); *G06F 9/451* (2018.02); *G06F 16/56* (2019.01); *G06K 9/00791* (2013.01); *G06T 7/246* (2017.01); *G06F 2203/011* (2013.01);

(Continued)

(58) Field of Classification Search
CPC .............. G06K 9/00268; G06K 9/451; G06K 9/00791; G06K 9/00302; G06K 9/00335; G06K 9/00362; G06T 7/246; G06T 2207/30201; G06T 2207/30252; G06F 16/56; G06F 3/011; G06F 2203/011; B60R 25/25; B60R 25/305
See application file for complete search history.

(56) References Cited

U.S. PATENT DOCUMENTS

| 7,697,729 B2 * | 4/2010 | Howell | G06K 9/00013 |
| | | | 382/115 |
| 8,441,548 B1 * | 5/2013 | Nechyba | H04N 5/23254 |
| | | | 348/222.1 |

(Continued)

FOREIGN PATENT DOCUMENTS

| DE | 102017201328 A1 * | 8/2018 | ......... G06K 9/00315 |
| JP | 2003216955 A * | 7/2003 | |

(Continued)

OTHER PUBLICATIONS

Machine Translation of JP 2003303363 A (Year: 2003).*

(Continued)

*Primary Examiner* — Michelle M Entezari
(74) *Attorney, Agent, or Firm* — Slater Matsil, LLP

(57) ABSTRACT

An apparatus for controlling a vehicle includes a sensor that detects motion and approach of an object around the vehicle, a camera that obtains a motion image and a facial image of the object around the vehicle, and a controller that generates a graphical user interface (GUI) based on the obtained motion and facial images of the object around the vehicle.

20 Claims, 14 Drawing Sheets

(51) Int. Cl.
*G06F 3/01* (2006.01)
*G06F 16/56* (2019.01)
*G06T 7/246* (2017.01)
*B60R 25/30* (2013.01)
*B60R 25/25* (2013.01)

(52) U.S. Cl.
CPC ..... *G06K 9/00302* (2013.01); *G06K 9/00335* (2013.01); *G06K 9/00362* (2013.01); *G06T 2207/30201* (2013.01); *G06T 2207/30252* (2013.01)

(56) References Cited

U.S. PATENT DOCUMENTS

| | | | | |
|---|---|---|---|---|
| 8,542,879 | B1* | 9/2013 | Nechyba | G06K 9/00221 |
| | | | | 382/103 |
| 8,553,088 | B2* | 10/2013 | Stein | B60Q 1/20 |
| | | | | 348/148 |
| 9,473,718 | B2* | 10/2016 | Kiyohara | H04N 5/225 |
| 9,576,189 | B2* | 2/2017 | Lim | G06K 9/00221 |
| 9,734,425 | B2* | 8/2017 | Zhong | G06K 9/4661 |
| 9,813,593 | B2* | 11/2017 | Akiyama | G06T 7/0004 |
| 9,969,331 | B2* | 5/2018 | Huebner | G06T 7/80 |
| 10,205,428 | B1* | 2/2019 | Paepcke | H03G 3/32 |
| 10,268,902 | B2* | 4/2019 | Akiyama | G08G 1/166 |
| 10,755,384 | B2* | 8/2020 | Akiyama | G06K 9/03 |
| 10,845,198 | B2* | 11/2020 | Best | G01C 23/00 |
| 2006/0250230 | A1* | 11/2006 | Fischer | B60R 25/1004 |
| | | | | 340/500 |
| 2011/0013812 | A1* | 1/2011 | Shin | G07C 9/37 |
| | | | | 382/118 |
| 2011/0304541 | A1* | 12/2011 | Dalal | G06F 3/017 |
| | | | | 345/158 |
| 2013/0050816 | A1* | 2/2013 | Kuwahara | H04N 13/368 |
| | | | | 359/462 |
| 2013/0054090 | A1* | 2/2013 | Shin | B60K 28/06 |
| | | | | 701/36 |
| 2014/0181959 | A1* | 6/2014 | Li | G06F 21/32 |
| | | | | 726/19 |
| 2015/0220991 | A1 | 8/2015 | Butts et al. | |
| 2016/0232201 | A1* | 8/2016 | Goran | G06F 16/24 |
| 2018/0101004 | A1 | 4/2018 | Jung et al. | |
| 2018/0275747 | A1* | 9/2018 | Campbell | G06F 3/04817 |
| 2019/0088130 | A1* | 3/2019 | Kapuria | G08G 1/16 |
| 2019/0244226 | A1* | 8/2019 | Freeman | G06Q 30/0201 |

FOREIGN PATENT DOCUMENTS

| | | | |
|---|---|---|---|
| JP | 2003303363 A | * | 10/2003 |
| JP | 2018083583 A | | 5/2018 |
| KR | 20100115250 A | | 10/2010 |
| KR | 20160016049 A | | 2/2016 |
| KR | 101795416 B1 | | 11/2017 |

OTHER PUBLICATIONS

Machine Translation of DE 102017201328 A1 (application date Jan. 27, 2017) (Year: 2018).*
Machine Translation of JP 2003216955 A (Year: 2003).*

* cited by examiner

APPARATUS AND METHOD FOR CONTROLLING VEHICLE

CROSS-REFERENCE TO RELATED APPLICATIONS

This application claims priority to Korean Patent Application No. 10-2018-0121244, filed in the Korean Intellectual Property Office on Oct. 11, 2018, which application is hereby incorporated herein by reference.

TECHNICAL FIELD

The present disclosure relates to an apparatus and method for controlling a vehicle.

BACKGROUND

A technology for emphasizing communication between a vehicle and a user has been developed in consideration of user convenience as well as an improvement in vehicle driving performance. For example, a technology for integrating a welcome system into an external lamp of a vehicle has been developed.

A welcome system is a system that reacts as if a vehicle welcomes a user when the user closely approaches the vehicle. Examples of an operating system associated with the welcome system include lighting of a lamp (e.g., a puddle lamp, a positioning lamp, a tail lamp, a pocket lamp, or the like), movement of an outside mirror, a welcome sound operation, and the like.

The welcome system is a new system that is capable of satisfying a user's emotional needs, as well as providing ease of recognition of a vehicle to the user.

However, the welcome system fails to reflect the user's status due to a uniform display and a uniform operating mode.

Meanwhile, a smart key system has been introduced for user convenience. A user carrying a smart key can control a door lock of a vehicle and can start the vehicle. Furthermore, functions are implemented such that components in a vehicle are not directly operated and controlled by a user, but automatically controlled through sensors.

In recent years, a technology for controlling a door lock of a vehicle by recognizing a user's face has been developed. A user may approach a vehicle to allow his/her face to be recognized. However, when the face is not accurately recognized, the cause is not fed back and re-recognition is frequently requested, thereby inconveniencing the user.

SUMMARY

Embodiments of the present disclosure can solve the above-mentioned problems occurring in the prior art while advantages achieved by the prior art are maintained intact.

An aspect of the present disclosure provides a vehicle control apparatus and method for outputting a graphical user interface to provide feedback that a face is not detected or outputting a graphical user interface according to a user's emotional state.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling a vehicle includes a sensor that detects approach of an object around the vehicle, a camera that obtains a motion image and a facial image of the object around the vehicle, and a controller that generates a graphical user interface (GUI), based on the obtained motion and facial images of the object around the vehicle.

The controller may extract a first feature vector, based on the motion image of the object around the vehicle.

The first feature vector may include at least one of a specific gesture and a body shape of the object around the vehicle.

The controller may extract a second feature vector from the facial image and may determine whether the object is a driver, based on the second feature vector.

The second feature vector may include at least one of a facial expression and a complexion.

The controller may generate multi-modal data, based on the second feature vector and the first feature vector matching the second feature vector.

The controller may determine an emotional state of the driver, based on the multi-modal data.

The controller may differently generate the graphical user interface (GUI) according to the emotional state.

The controller may control locking/unlocking of doors of the vehicle when determining that the object around the vehicle is the driver.

The controller may determine whether a face of the object around the vehicle is detected, based on the motion image, and when determining that the face is not detected, the controller may generate a graphical user interface to provide feedback on a reason why the face is not detected.

The apparatus may further include a window display on which the graphical user interface (GUI) is output.

According to another aspect of the present disclosure, a method for controlling a vehicle includes a step of obtaining a motion image and a facial image of an object around the vehicle, a step of determining a driver's emotional state, based on the obtained motion and facial images of the object around the vehicle, and a step of outputting a graphical user interface generated based on the driver's emotional state.

The method may further include a step of determining whether a face of the object around the vehicle is detected, based on the motion image, prior to the step of obtaining the facial image of the object around the vehicle, and a step of outputting a graphical user interface to provide feedback on a reason why the face is not detected, when determining that the face of the object around the vehicle is not detected.

The method may further include a step of extracting a first feature vector from the motion image of the object around the vehicle after the step of obtaining the motion image of the object around the vehicle.

The first feature vector may include at least one of a specific gesture and a body shape of the object around the vehicle.

The method may further include a step of extracting a second feature vector from the facial image of the object around the vehicle and determining whether the object is the driver, based on the second feature vector, after the step of obtaining the facial image of the object around the vehicle.

The second feature vector may include at least one of a facial expression and a complexion.

The step of determining the driver's emotional state based on the obtained motion and facial images of the object around the vehicle may include a step of generating multi-modal data, based on the second feature vector and the first feature vector matching the second feature vector and a step of determining the driver's emotional state, based on the multi-modal data.

The method may further include a step of controlling locking/unlocking of doors of the vehicle when determining that the object around the vehicle is the driver.

In the step of outputting the graphical user interface generated based on the driver's emotional state, the graphical user interface may be differently output according to the driver's emotional state.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
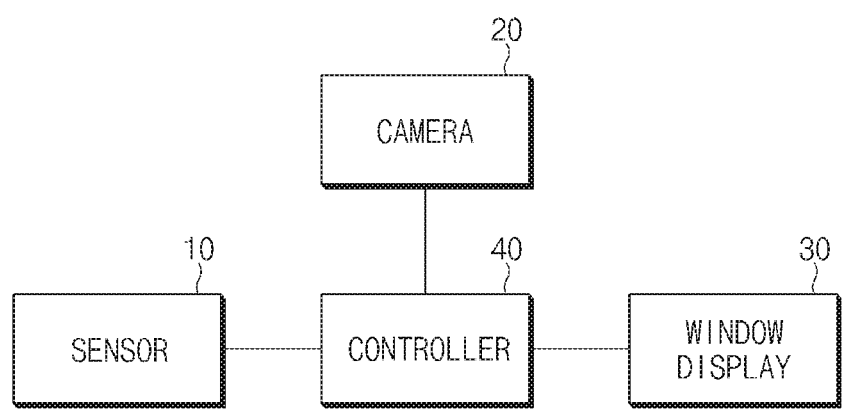
FIG. 1 is a block diagram illustrating an apparatus for controlling a vehicle according to an embodiment of the present disclosure.

Hereinafter, exemplary embodiments of the present disclosure will be described in detail with reference to the accompanying drawings. It should be understood that even if shown in different drawings, identical components are provided with identical reference numerals in the drawings. Furthermore, in describing the embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component, and the substance, sequence, order, or number of these components is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating an apparatus for controlling a vehicle according to an embodiment of the present disclosure.

As illustrated in FIG. 1, the vehicle control apparatus according to the embodiment of the present disclosure may include a sensor 10, a camera 20, a window display 30, and a controller 40.

The sensor 10 may detect motion and approach of an object around the vehicle. To this end, the sensor 10 may be implemented with a proximity sensor and may be located on a lateral side of the vehicle. Here, the motion of the object around the vehicle may refer to motions of all objects that move around the vehicle, and the object may include a user.

The proximity sensor may detect whether any object approaches a preset control zone, without mechanical contact. The proximity sensor may include an IR sensor, a capacitive sensor, an RF sensor, or the like.

According to an embodiment, the sensor 10 may detect motion and approach of a surrounding object within a predetermined distance from the vehicle. Here, the predetermined distance may be defined to be 30 cm.

The camera 20 may obtain a motion image and a facial image of the object around the vehicle. To this end, according to an embodiment, the camera 20 may be included in a pillar (that is, a center pillar (a B pillar)) of the vehicle.

In the case where the camera 20 is included in the side pillar, the camera 20 has a vertical angle of view ranging from 42° to 70° and a horizontal angle of view ranging from 45° to 55°.

The window display 30 may include a door glass onto which an image is projected in a projector manner.

According to an embodiment, the window display 30 may be implemented in such a manner that images are projected onto door glasses on opposite sides of the front seats of the vehicle.

The controller 40 may control an overall operation of the vehicle control apparatus of the present disclosure. When determining that the motion of the object around the vehicle is detected, the controller 40 may extract a first feature vector from the motion image of the object obtained from the camera 20.

Here, the first feature vector is intended to detect the feature of the motion of the object around the vehicle. According to an embodiment, the first feature vector may include a specific gesture or a body shape of the object around the vehicle. A face may be included in the body shape. Since the detected face does not have accuracy sufficient to determine whether the object is a driver or not, it is not easy to determine whether the object is the driver or not, based on only the face extracted as the first feature vector.

Therefore, the controller 40 may extract the specific gesture or the body shape of the object around the vehicle from the motion image of the object and may detect the feature of the motion of the object around the vehicle from the specific gesture or the body shape.

When determining that the object around the vehicle approaches the vehicle, the controller 40 may determine whether a face of the object around the vehicle is detected. When determining that the face of the object around the vehicle is detected, the controller 40 may extract a second feature vector from the facial image of the object obtained from the camera 20.

Here, the second feature vector is intended to detect a facial expression. According to an embodiment, the second feature vector may include facial features (eyes, nose, and mouth) and a complexion.

Accordingly, the controller 40 may extract the facial features or the complexion from the facial image of the object around the vehicle and may detect the feature of the facial expression from the facial features or the complexion.

The controller 40 may determine who the object around the vehicle is, based on the extracted second feature vector. When it is determined that the object around the vehicle is a driver registered in the vehicle, the controller 40 may perform control such that doors of the vehicle are locked/unlocked. Meanwhile, when it is determined that the object around the vehicle is not the driver registered in the vehicle, the controller 40 may perform control such that the doors of the vehicle are not locked/unlocked.

The controller 40 may generate multi-modal data by matching the first feature vector and the second feature vector when determining that the object around the vehicle is the driver, by comparing the object around the vehicle and information about the driver registered in the vehicle, based on the extracted second feature vector.

More specifically, the controller 40 may match the extracted second feature vector of the driver (that is, the driver's facial features or complexion) and the body shape of the object around the vehicle and may generate the multi-modal data based on the matching first feature vector. Since the first feature vector is extracted from motions of all objects around the vehicle as well as the driver, all first feature vectors extracted are not used to generate the multi-modal data, and only the feature of the first feature vector that matches the driver's facial features or complexion extracted from the second feature vector may be selected and used to generate the multi-modal data.

The controller 40 may determine the driver's emotional state, based on the generated multi-modal data. For example, the controller 40 may determine the driver's current emotional state to be a pleasant state, a bored state, or a sorrowful state.

When the driver's emotional state is determined, the controller 40 may generate a graphical user interface according to the emotional state and may output the graphical user interface on the window display 30. A specific description thereabout will be given with reference to FIGS. 7 to 9.

Meanwhile, when determining that the object around the vehicle approaches the vehicle, but the face is not detected, the controller 40 may provide, through the window display 30, feedback that the face is not detected.

For example, when determining that the object around the vehicle is not located within the angle of view of the camera 20, the controller 40 may generate a graphical user interface for leading the object to be located within the angle of view of the camera 20. The controller 40 may resize a graphic according to the distance between the vehicle and the object therearound. For example, the controller 40 may make the output graphic larger in size when the object around the vehicle is located farther away from the vehicle and may make the output graphic smaller in size when the object around the vehicle is located closer to the vehicle.

When determining that the object around the vehicle is difficult to detect due to foreign matter on the camera 20 although being located within the angle of view of the camera 20, the controller 40 may provide feedback that the foreign matter exists on the camera 20, thereby enabling the face to be easily detected.

Figure 2:
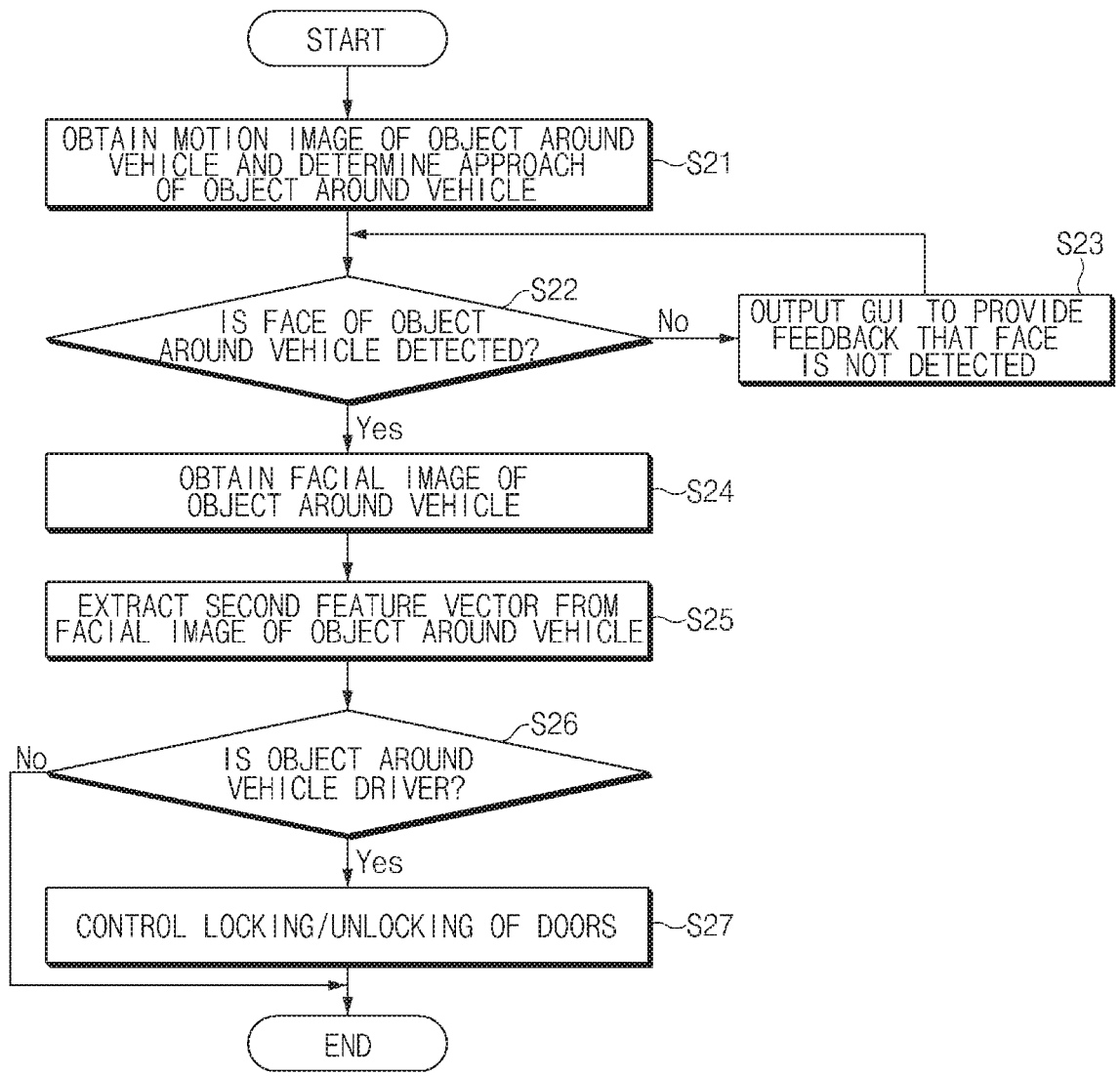
FIG. 2 is a flowchart illustrating a method for controlling a vehicle according to an embodiment of the present disclosure.

FIG. 2 is a flowchart illustrating a method for controlling a vehicle according to an embodiment of the present disclosure.

As illustrated in FIG. 2, in the vehicle control method according to the embodiment of the present disclosure, the controller 40 obtains a motion image of an object around the vehicle and determines approach of the object around the vehicle (Step S21). When the approach of the object around the vehicle is determined through the sensor 10, the controller 40 determines whether a face is detected, based on the motion image (Step S22).

When it is determined in step S22 that the face is not detected, the controller 40 generates a graphical user interface to provide feedback that the face is not detected and outputs the graphical user interface through the window display 30 (Step S23).

When determining that the object around the vehicle is not located within the angle of view of the camera 20, the controller 40 may, in step S23, generate a graphical user interface for leading the object to be located within the angle of view of the camera 20. For example, the controller 40 may resize a graphic according to the distance between the vehicle and the object therearound. The controller 40 may make the output graphic larger in size when the object around the vehicle is located farther away from the vehicle and may make the output graphic smaller in size when the object is located closer to the vehicle.

When determining that the object around the vehicle is difficult to detect due to foreign matter on the camera 20 although being located within the angle of view of the camera 20, the controller 40 may, in step S23, provide feedback that the foreign matter exists on the camera 20, thereby enabling the face to be easily detected.

The controller 40 obtains a facial image of the object around the vehicle from the camera 20 (Step S24).

The controller 40 extracts a second feature vector, based on the facial image of the object obtained in step S24 (Step S25). Here, the second feature vector is intended to detect a facial expression. According to an embodiment, the second feature vector may include facial features (eyes, nose, and mouth) and a complexion.

The controller 40 determines whether the object around the vehicle is a driver registered in the vehicle, based on the second feature vector extracted in step S25 (Step S26). When it is determined in step S26 that the object around the vehicle is the driver (Y), the controller 40 performs control to lock or unlock doors of the vehicle (Step S27). Meanwhile, when it is determined in step S26 that the object around the vehicle is not the driver registered in the vehicle, the controller 40 ends the process.

Figure 3:
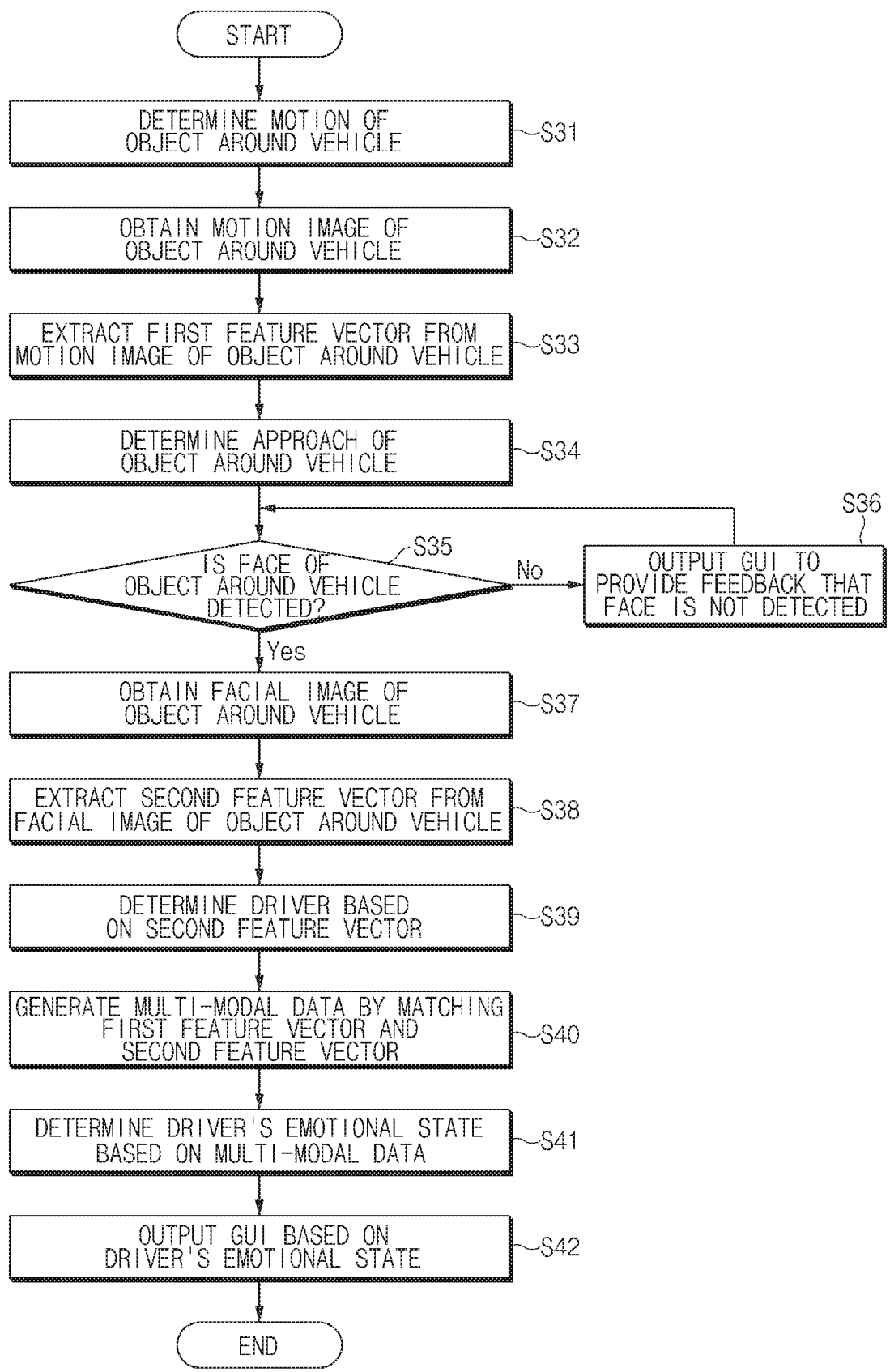
FIG. 3 is a flowchart illustrating a method for controlling a vehicle according to another embodiment of the present disclosure.

FIG. 3 is a flowchart illustrating a method for controlling a vehicle according to another embodiment of the present disclosure.

As illustrated in FIG. 3, in the vehicle control method according to the other embodiment of the present disclosure, the controller 40 determines motion of an object around the vehicle that is detected by the sensor 10 (Step S31). The motion of the object around the vehicle in step S31 may refer to motions of all objects that move around the vehicle, and the object may include a user.

When determining that there is the motion of the object around the vehicle, the controller 40 obtains a motion image of the object around the vehicle from the camera 20 (Step S32).

The controller 40 extracts a first feature vector, based on the motion image of the object around the vehicle (Step S33). Here, the first feature vector is intended to detect the feature of the motion of the object around the vehicle. According to an embodiment, the first feature vector may include a specific gesture or a body shape of the object around the vehicle. A face may be included in the body shape. Since the detected face does not have accuracy sufficient to determine whether the object is a driver or not, it is not easy to determine whether the object is the driver or not, based on only the body shape extracted as the first feature vector.

The controller 40 determines approach of the object detected by the sensor 10 to the vehicle (Step S34). When determining that the object around the vehicle approaches the vehicle, the controller 40 determines whether a face is detected, based on the motion image (Step S35).

When it is determined in step S35 that the face is not detected (N), the controller 40 generates a graphical user interface to provide feedback that the face is not detected and outputs the graphical user interface through the window display 30 (Step S36).

When determining that the object around the vehicle is not located within the angle of view of the camera 20, the controller 40 may, in step S36, generate a graphical user interface for leading the object to be located within the angle of view of the camera 20. For example, the controller 40 may resize a graphic according to the distance from the object around the vehicle. The controller 40 may make the output graphic larger in size when the object around the vehicle is located farther away from the vehicle and may make the output graphic smaller in size when the object around the vehicle is located closer to the vehicle.

When determining that the object around the vehicle is difficult to detect due to foreign matter on the camera 20 although being located within the angle of view of the camera 20, the controller 40 may, in step S36, provide feedback that the foreign matter exists on the camera 20, thereby enabling the face to be easily detected.

Meanwhile, when it is determined in step S35 that the face is detected (Y), the controller 40 obtains a facial image of the object around the vehicle from the camera 20 (Step S37).

The controller 40 extracts a second feature vector, based on the obtained facial image (Step S38). Here, the second feature vector is intended to detect a facial expression. According to an embodiment, the second feature vector may include facial features (eyes, nose, and mouth) and a complexion.

The controller 40 determines whether the object around the vehicle is a driver registered in the vehicle, based on the second feature vector extracted in step S38 (Step S39).

When determining that the object around the vehicle is the driver, the controller 40 generates multi-modal data by matching the first feature vector and the second feature vector (Step S40).

In step S40, the controller 40 may match the extracted second feature vector of the driver (that is, the driver's facial features or complexion) and the body shape of the object around the vehicle and may generate the multi-modal data based on the matching first feature vector. Since the first feature vector is extracted motions of all objects around the vehicle as well as the driver, all first feature vectors extracted are not used to generate the multi-modal data, and only the feature of the first feature vector that matches the driver's facial features or complexion extracted from the second feature vector may be selected and used to generate the multi-modal data.

The controller 40 determines the driver's emotional state, based on the generated multi-modal data (Step S41). In step S41, the controller 40 may determine the driver's current emotional state to be a pleasant state, a bored state, or a sorrowful state, based on the multi-modal data.

When the driver's emotional state is determined, the controller 40 generates a graphical user interface according to the emotional state and outputs the graphical user interface on the window display 30 (Step S42).

Figure 4:
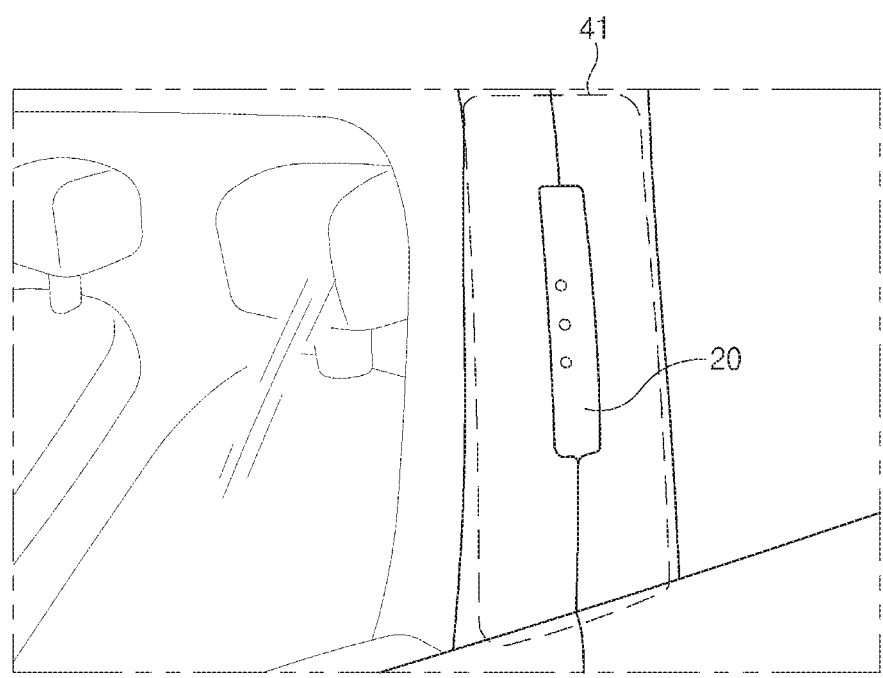
FIG. 4 is a view illustrating a camera included in the vehicle control apparatus according to an embodiment of the present disclosure.

FIG. 4 is a view illustrating the camera included in the vehicle control apparatus according to an embodiment of the present disclosure.

As illustrated in FIG. 4, the camera 20 according to the embodiment of the present disclosure may be inserted into a center pillar (a B pillar) 41 on a lateral side of the vehicle and therefore may easily obtain a motion image of an object around the vehicle and a facial image of the object that closely approaches the vehicle.

Figure 5:
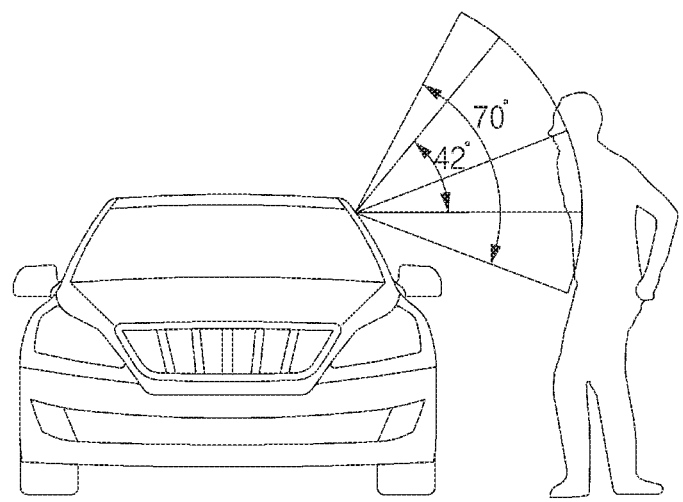
FIG. 5 is a view illustrating the angle of view of the camera according to an embodiment of the present disclosure.

FIG. 5 is a view illustrating the angle of view of the camera according to an embodiment of the present disclosure.

As illustrated in FIG. 5, the angle of view of the camera 20 according to the embodiment of the present disclosure ranges from 42° to 70°. Accordingly, the camera 20 may easily take facial and motion images of an object that is located 30 cm from the vehicle.

Figure 6:
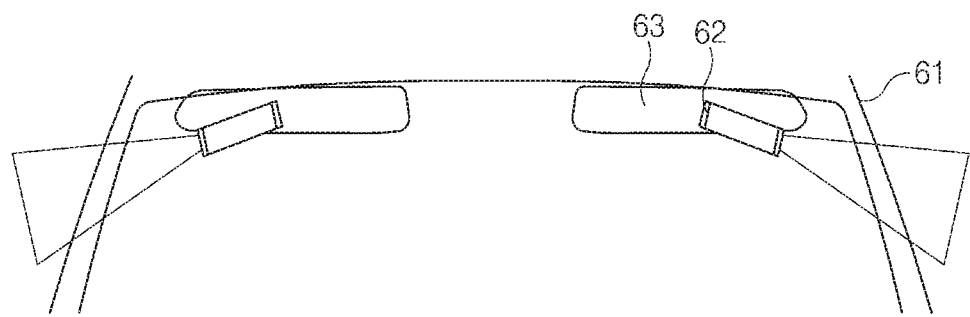
FIG. 6 is a view illustrating a display type according to an embodiment of the present disclosure.

FIG. 6 is a view illustrating a display type according to an embodiment of the present disclosure.

As illustrated in FIG. 6, the window display 30 of the present disclosure may include window displays 61 onto which images are projected from projectors 62. Here, the projectors 62 are intended to project images toward the window displays 61 on opposite sides of the vehicle. According to an embodiment, the projectors 62 may be included in sun visors 63 inside the vehicle.

FIGS. 7 to 13 are views illustrating graphical user interfaces output according to embodiments of the present disclosure.

Figure 7:
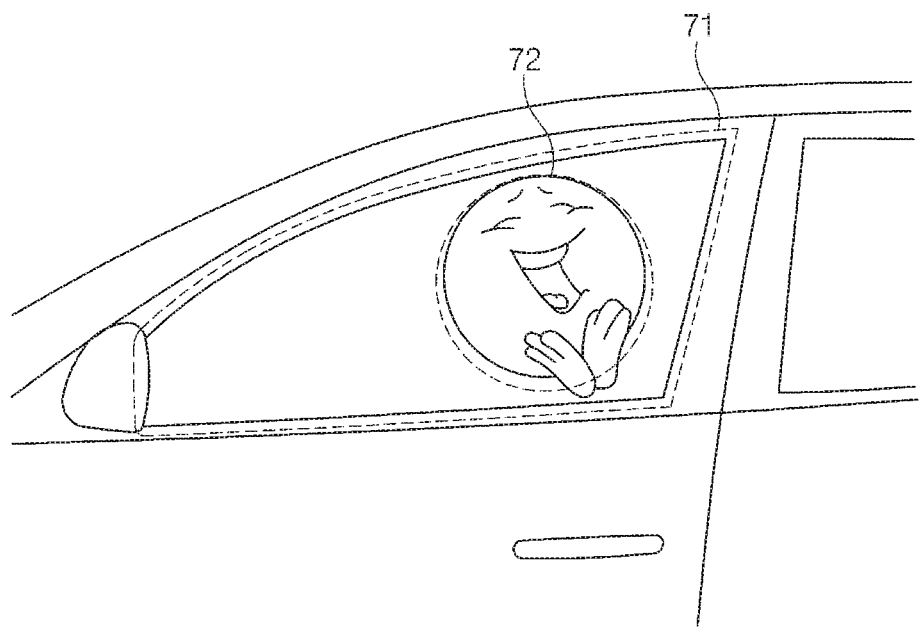
FIGS. 7 to 13 are views illustrating graphical user interfaces displayed according to embodiments of the present disclosure.
Figure 8:
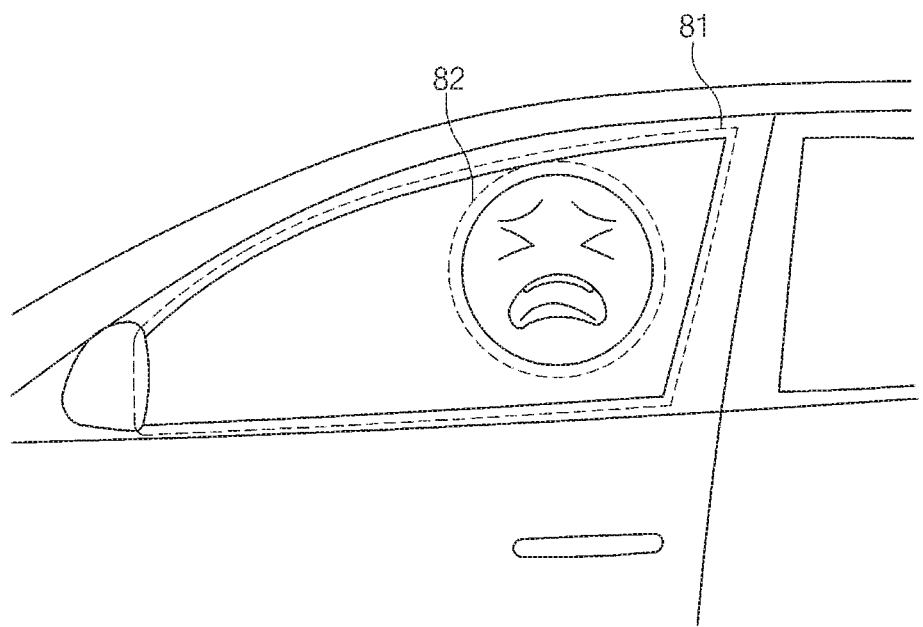
Figure 9:
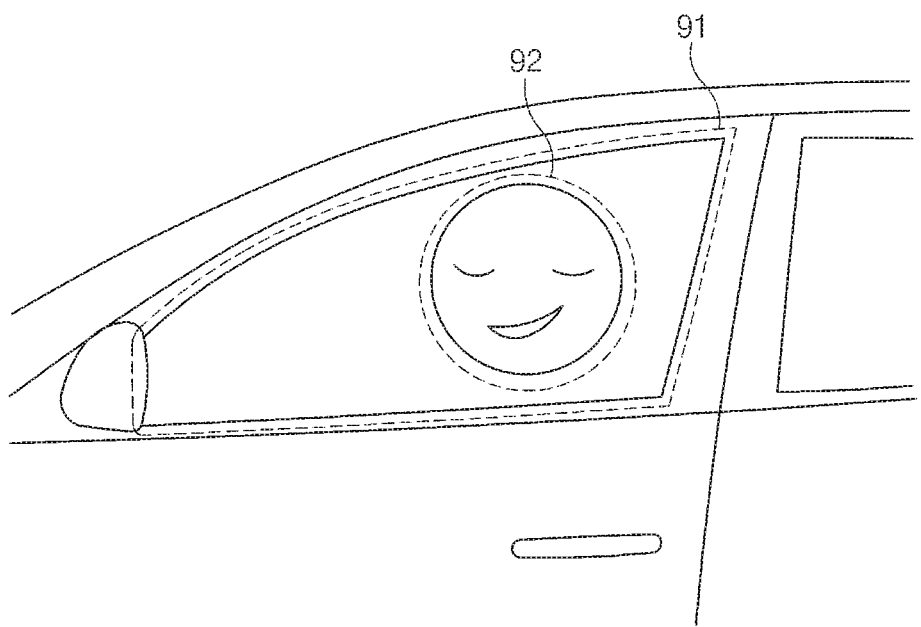

FIGS. 7 to 9 are views illustrating graphical user interfaces that are differently generated according to a driver's emotional states determined by the controller 40.

As illustrated in FIG. 7, according to an embodiment of the present disclosure, when determining the driver's emotional state to be a pleasant state, the controller 40 may output an emoticon 72 having a pleasant expression on a window display 71.

As illustrated in FIG. 8, according to an embodiment of the present disclosure, when determining the driver's emotional state to be a sorrowful state, the controller 40 may output an emoticon 82 having a sorrowful expression on a window display 81.

As illustrated in FIG. 9, according to an embodiment of the present disclosure, when determining the driver's emotional state to be a bored state, the controller 40 may output an emoticon 92 having a bored expression on a window display 91.

In addition, as illustrated in FIGS. 10 to 13, when determining that an object around the vehicle approaches the vehicle, but a face is not detected, the controller 40 may provide, through the window display 30, feedback that the face is not detected.

Figure 10:
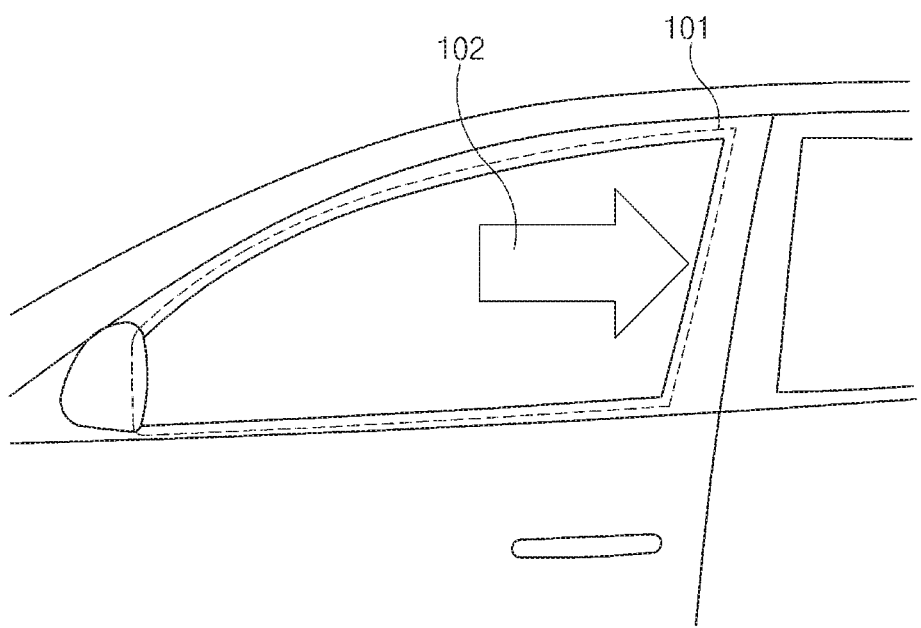
Figure 11:
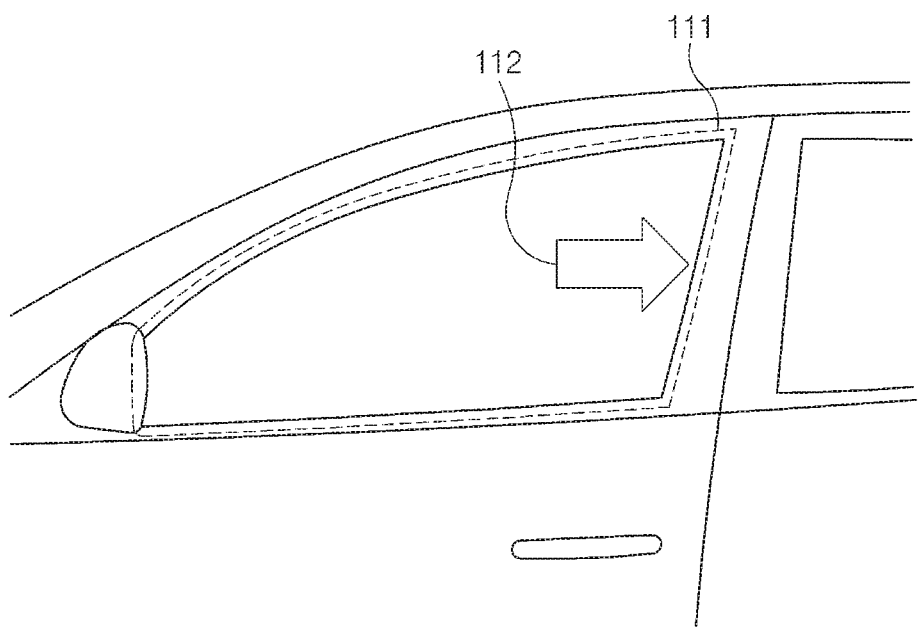

As illustrated in FIGS. 10 and 11, according to embodiments of the present disclosure, when the controller 40 determines that the object around the vehicle approaches the vehicle, but the face is not detected because the object is not located within the angle of view of the camera 20, the controller 40 may output, on displays 101 and 111, images for leading the face to be moved to the position of the camera 20 inserted into the center pillar. As illustrated in FIGS. 10 and 11, the images for leading the face to be moved may include arrows 102 and 112. Without being limited thereto, however, the images may be implemented in various forms. Furthermore, the images may be output to have different sizes according to the distance. In addition, the images may include numbers that lead the face to be moved and represent the distance between the vehicle and the object therearound.

For example, the controller 40 may increase the size of the arrow 102 as illustrated in FIG. 10 when determining that the object around the vehicle is far away from the vehicle and may decrease the size of the arrow 112 as illustrated in FIG. 11 when determining that the object around the vehicle is close to the object.

Figure 12:
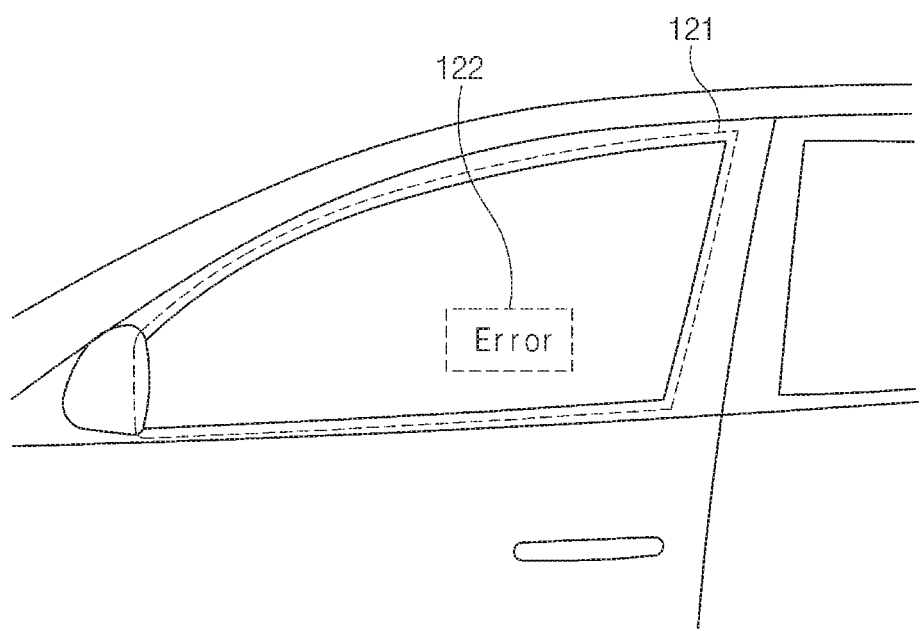
Figure 13:
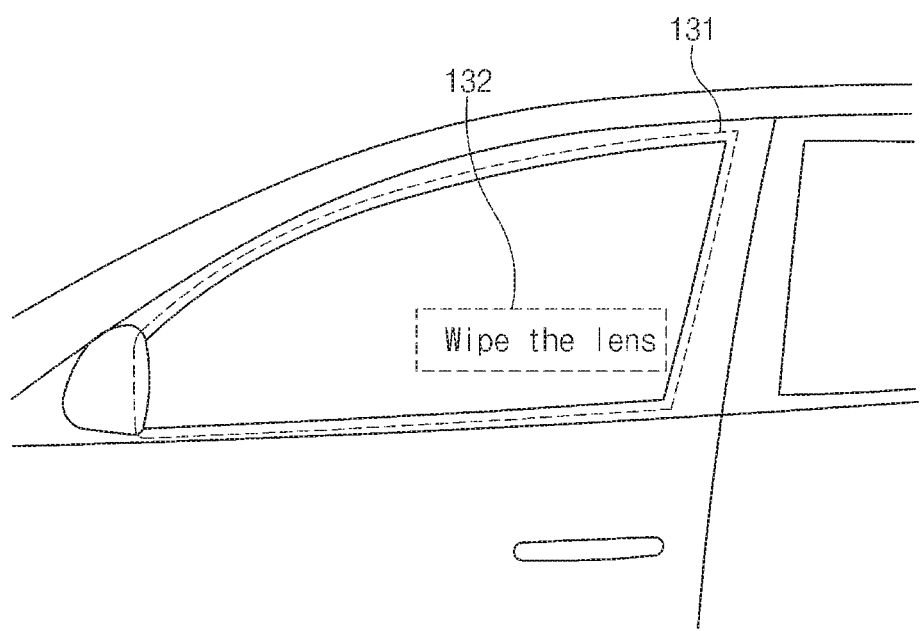

As illustrated in FIGS. 12 and 13, according to embodiments of the present disclosure, when an object around the vehicle is difficult to detect due to foreign matter on the camera 20 although being located within the angle of view of the camera 20, the controller 40 may provide feedback that the foreign matter exists on the camera 20, thereby enabling the face to be easily detected. For example, the controller 40 may perform control to generate and output a text message "error" 122 on a window display 121 as illustrated in FIG. 12, or to generate and output a text message "wipe the lens" 132 on a window display 131 as illustrated in FIG. 13. However, a thing that is output for the feedback is not limited to the text messages and may include images reflecting the feedback contents. For example, the controller 40 may output an image on the window display 131 near the B pillar to provide feedback that the face is not detected due to the foreign matter, or may output a red circular image to provide feedback that the foreign matter exists on the camera 20.

Figure 14:
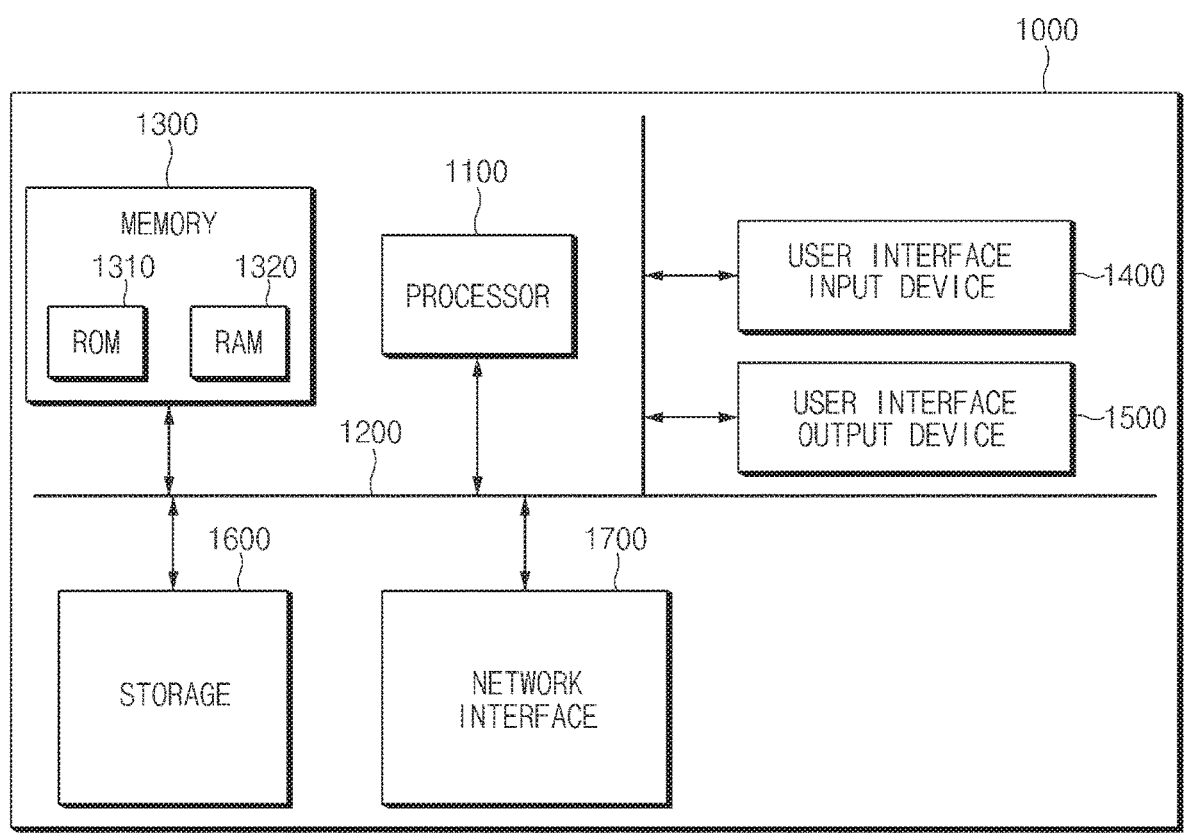
FIG. 14 is a block diagram illustrating a configuration of a computing system that executes a method according to an embodiment of the present disclosure.

FIG. 14 is a block diagram illustrating a configuration of a computing system 1000 that executes a method according to an embodiment of the present disclosure.

Referring to FIG. 14, the computing system 1000 may include at least one processor 1100, a memory 1300, a user interface input device 1400, a user interface output device 1500, a storage 1600, and a network interface 1700 that are connected together through a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage mediums. For example, the memory 1300 may include a read only memory (ROM) 1310 and a random access memory (RAM) 1320.

Accordingly, the steps of the methods or algorithms described above in relation to the embodiments disclosed herein may be directly implemented with a hardware module or a software module executed by the processor 1100, or a combination thereof. The software module may reside in a storage medium (that is, the memory 1300 and/or the storage 1600) such as a RAM memory, a flash memory, a ROM memory, an EPROM memory, an EEPROM memory, a register, a hard disk, a detachable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside in a user terminal. In another case, the processor 1100 and the storage medium may reside in the user terminal as separate components.

According to the embodiments of the present disclosure, the vehicle control apparatus and method may output a graphical user interface to provide feedback that a face is not detected or may output a graphical user interface differently generated according to an emotional state, thereby providing an aesthetic value to a user and improving the merchantability of a vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling a vehicle, the apparatus comprising:
   a sensor configured to detect approach of an object around the vehicle;
   a camera configured to obtain a motion image of the object around the vehicle and a facial image of the object around the vehicle when the object is a person; and
   a controller configured to generate a graphical user interface, to determine that the object is a person based on the facial image of the object around the vehicle, to determine an emotional state of the person when the facial image and the motion image of the object around the vehicle are obtained, and to determine whether a face of the person around the vehicle is detected based on the motion image;
   wherein the graphical user interface includes an image corresponding to the determined emotional state of the person when it is determined that the face of the object is detected and an image for leading the face of the object around the vehicle to move to a position of the camera when it is determined that the face is not detected; and
   wherein the controller is configured to generate the graphical user interface to provide feedback on a reason why the face of the object around the vehicle is not detected when it is determined that the face is not detected as being due to foreign matter on the camera even though the person is located within an angle of view of the camera.

2. The apparatus of claim 1, wherein the controller is configured to extract a first feature vector based on the motion image of the object around the vehicle.

3. The apparatus of claim 2, wherein the first feature vector includes a specific gesture or a body shape of the object around the vehicle.

4. The apparatus of claim 2, wherein the controller is configured to extract a second feature vector from the facial image and to determine whether the object is the person based on the second feature vector.

5. The apparatus of claim 4, wherein the second feature vector includes a facial expression or a complexion.

6. The apparatus of claim 4, wherein the controller is configured to generate multi-modal data, based on the second feature vector and the first feature vector matching the second feature vector.

7. The apparatus of claim 6, wherein the controller is configured to determine the emotional state of the person based on the multi-modal data.

8. The apparatus of claim 4, wherein the controller is configured to control locking/unlocking of doors of the vehicle when it is determined that the object around the vehicle is the person.

9. The apparatus of claim 1, further comprising a window display on which the graphical user interface is output.

10. A method for controlling a vehicle, the method comprising:
   determining whether a motion image and a facial image of an object around the vehicle are obtained, the object being a person;
   determining a person's emotional state based on the motion and facial images of the object around the vehicle when it is determined the motion and facial images of the object are obtained, wherein the person is outside the vehicle when determining the person's emotional state; and
   outputting a graphical user interface generated based on the person's emotional state when it is determined the motion and facial images of the object are obtained, wherein the graphical user interface includes an image corresponding to the person's emotional state generated when determining the emotional state of the person based on the motion image and the facial image when it is determined the facial image of the object is detected;
   outputting the graphical user interface including an image for leading a face to move to a position of a camera when it is determined the facial image of the object is not obtained; and
   outputting the graphical user interface to provide feedback on a reason why the facial image of the object is not detected when the facial image of the object is not detected as being due to foreign matter on the camera even though the object is located within an angle of view of the camera.

11. The method of claim 10, further comprising extracting a first feature vector from the motion image of the object around the vehicle after determining the motion image of the object around the vehicle was obtained.

12. The method of claim 11, wherein the first feature vector includes a specific gesture or a body shape of the object around the vehicle.

13. The method of claim 11, further comprising extracting a second feature vector from the facial image of the object around the vehicle and determining that the object is the person based on the second feature vector, the extracting of the second feature vector being performed after determining the facial image of the object around the vehicle was obtained.

14. The method of claim 13, wherein the second feature vector includes a facial expression or a complexion.

15. The method of claim 13, wherein determining the person's emotional state based on the motion and facial images of the object around the vehicle comprises:
   generating multi-modal data based on the second feature vector and the first feature vector matching the second feature vector; and
   determining the person's emotional state based on the multi-modal data.

16. The method of claim 13, further comprising controlling locking/unlocking of doors of the vehicle when determining that the object around the vehicle is the person.

17. The method of claim 10, wherein the graphical user interface is output differently according to the person's emotional state when outputting the graphical user interface generated based on the person's emotional state.

18. A method for controlling a vehicle, the method comprising:
   obtaining a motion image of a person around the vehicle;
   determining whether a face of the person around the vehicle is detected based on the motion image;
   when the face of the person is detected:
      obtaining a facial image of the person around the vehicle;
      determining a person's emotional state, based on the obtained motion and facial images of the person around the vehicle, wherein the person is outside the vehicle when determining the person's emotional state; and
      outputting a graphical user interface generated based on the person's emotional state, wherein the graphical user interface includes an image corresponding to the person's emotional state determined based on the motion image and the facial image; and
   when the face of the person around the vehicle is not detected, outputting the graphical user interface to provide feedback on a reason why the face is not detected as being due to foreign matter on a camera even though the face of the person is located within an angle of view of the camera.

19. The method of claim 18, further comprising:
   extracting a first feature vector from the motion image of the person around the vehicle after obtaining the motion image of the person around the vehicle; and
   extracting a second feature vector from the facial image of the person around the vehicle and determining that the person is the person based on the second feature vector.

20. The method of claim 18, wherein when the face of the person around the vehicle is not detected, the method further comprises outputting the graphical user interface to include an image for leading the face to move to a position of the camera.

* * * * *